United States Patent [19]
Ichimura et al.

[11] Patent Number: 6,115,347
[45] Date of Patent: Sep. 5, 2000

[54] OPTICAL PICK-UP DEVICE, OPTICAL RECORDING/REPRODUCING APPARATUS AND OBJECTIVE LENS

[75] Inventors: Isao Ichimura, Kanagawa; Fumisada Maeda, Tokyo; Kenji Yamamoto, Saitama; Kiyoshi Ohsato, Chiba; Toshio Watanabe, Kanagawa; Atsushi Fukumoto, Kanagawa; Akira Suzuki, Kanagawa, all of Japan

[73] Assignee: Sony Corporation, Tokyo, Japan

[21] Appl. No.: 08/919,119

[22] Filed: Aug. 28, 1997

Related U.S. Application Data

[63] Continuation-in-part of application No. 08/744,007, Feb. 12, 1996, Pat. No. 5,712,842.

[30] Foreign Application Priority Data

Aug. 28, 1996 [JP] Japan ................................. 8-226864

[51] Int. Cl.⁷ ...................................................... G11B 7/00
[52] U.S. Cl. ..................... 369/112; 369/44.14; 369/44.23
[58] Field of Search ................................. 369/112, 110, 369/13, 44.14, 44.23, 44.15; 359/819, 644

[56] References Cited

U.S. PATENT DOCUMENTS

| | | | |
|---|---|---|---|
| 5,004,307 | 4/1991 | Kino et al. | 359/356 |
| 5,125,750 | 6/1992 | Corle et al. | 359/819 |
| 5,712,842 | 1/1998 | Yamamoto et al. | 369/112 |
| 5,764,613 | 6/1998 | Yamamoto et al. | 369/112 |

OTHER PUBLICATIONS

Isao Ichimura, Shinichi Hayashi, and G. S. Kino "High Density Optical Recording Using a Solid Immersion Lens" Nov. 1995.

*Primary Examiner*—Thang V. Tran
*Attorney, Agent, or Firm*—Ronald P. Kananen; Rader, Fishman & Grauer

[57] ABSTRACT

An optical pickup device for improving the numerical aperture of an objective lens and for assuring high-reliability recording/reproduction of information signals. The optical pickup device has a first lens 6 having a curvilinear or planar surface facing an optical recording medium 5 and having the numerical aperture set to a pre-set value, and a second lens 3 arranged for clamping the first lens 6 between t and the optical recording medium 5. The optical pickup device also has a light-converging optical system for converging the reflected light from the surface of the optical recording medium 5 and a first movement unit 2 for moving the first objective lens 6 and the second lens 3 along the direction of the optical axis with respect to the second objective lens 3. The optical pickup device also has a second movement unit 11 for moving the first objective lens 6 along the direction of the optical axis relative to the second objective lens 3 and a fixation unit 12 for fixing the first objective lens 6 moved by the second movement unit 9. The method for adjusting the optical processing device includes a step of adjusting the position along the optical axis of the first objective lens 6 and a step of fixing the position of the first lens 6.

9 Claims, 4 Drawing Sheets

OPTICAL PICK-UP DEVICE, OPTICAL RECORDING/REPRODUCING APPARATUS AND OBJECTIVE LENS

This is a continuation-in-part of application Ser. No. 08/744,007 (now U.S. Pat. No. 5,712,842), filed Feb. 12, 1996.

BACKGROUND OF THE INVENTION

1. Field of the Invention

This invention relates to an optical pickup device for condensing a laser light beam on a signal recording surface of an optical recording medium and a method for adjusting the optical pickup device.

2. Description of the Related Art

Recently, the tendency is towards higher recording density of a disc-shaped recording medium, such as an optical disc or a magneto-optical disc, as a recording device for a computer system or as a package media for music or video information. Among the methods for increasing the recording density of these recording media, there is a method of increasing the numerical aperture of an objective lens provided on an optical pickup device for reducing the spot size of the laser light beam radiated on the recording medium and hence the recording pit size for raising the recording density of the recording medium.

In general, the converged light spot size in an optical pickup device is given as $\lambda/NA$ where $\lambda$ is the wavelength of the laser light radiated on the recording medium and NA is the numerical aperture of the objective lens. Thus, by increasing the numerical aperture of the objective lens, the laser light beam can be illuminated on the recording medium for reducing the converged spot size and hence the recording bit size for improving the recording density.

However, a limitation of approximately 0.6 is imposed on the numerical aperture of the objective lens because of manufacturing constraint on the non-spherical simplex lens used predominantly as an objective lens. On the other hand, if a larger numerical aperture is used in order that the tilt or warping of the recording medium or the wavefront aberration of the laser light beam caused by assembling precision of the optical pickup device will be comprised within an allowable range, the disc substrate needs to be reduced in thickness. In the case of a digital video disc (DVD), for example, the disc substrate thickness is set to approximately 0.6 mm.

There has also been proposed an optical system of an optical pickup device in which, by way of providing an objective lens unit having the numerical aperture of not less than 0.6, a solid immersion lens (SIL) as disclosed in U.S. Pat. No. 5,125,750 is arranged between the objective lens and the recording medium to provide a so-called two-lens sets for improving the numerical aperture to not less than 0.8.

However, with this objective lens unit, the SIL constituting one of the two lens sets needs to be maintained at an optimum distance from the recording medium (referred to herein as an air gap). If this air gap is changed significantly, there is produced spherical aberration on the surface of the recording medium thus deteriorating an output signal from the recording medium as the information signals while disabling recording and/or reproduction of the information signals for the recording medium.

On the other hand, in an optical disc recording/reproducing apparatus, it is necessary to maintain a constant value of the air gap and a constant value of the distance between the objective lens and the SIL for maintaining the constant values of the air gap and the distance between the objective lens and the SIL. For coping with these requirements, the objective lens and the SIL are position-adjusted for minimizing the spherical aberration at the time of assembling the two lens sets.

Moreover, in the optical pickup device, it is usually difficult to make direct visual inspection of the spherical aberration.

OBJECT AND SUMMARY OF THE INVENTION

It is therefore an object of the present invention to provide an optical pickup device whereby the numerical aperture of the objective lens can be improved and information signals can be recorded and/or reproduced correctly, and a method for adjusting the optical pickup device.

In one aspect, the present invention provides an optical pickup device including a double-set objective lens having a first lens and a second lens, first movement means for moving the first and second lenses at least along the optical axis, second movement means for moving the first lens arranged facing an optical recording medium along the optical axis relative to the second lens and fixation means for immobilizing the first lens moved by the second movement means.

In another aspect, the present invention provides an optical recording/reproducing apparatus including a double-set objective lens having a first lens and a second lens, first movement means for moving the first and second lenses at least along the optical axis, second movement means for moving the first lens arranged facing an optical recording medium along the optical axis relative to the second lens, detection means for detecting the information of the optical recording medium via the objective lens and control means for driving the second movement means based on a signal from the detection means.

In yet another aspect, the present invention provides a method for adjusting a double-set objective lens having a first lens and a second lens used for recording and/or reproducing an optical recording medium including the steps of detecting the information from the optical recording medium and driving movement means moving the first lens facing the optical recording medium relative to the second lens based on the reproduced signal.

DESCRIPTION OF THE PREFERRED EMBODIMENTS

Figure 1:
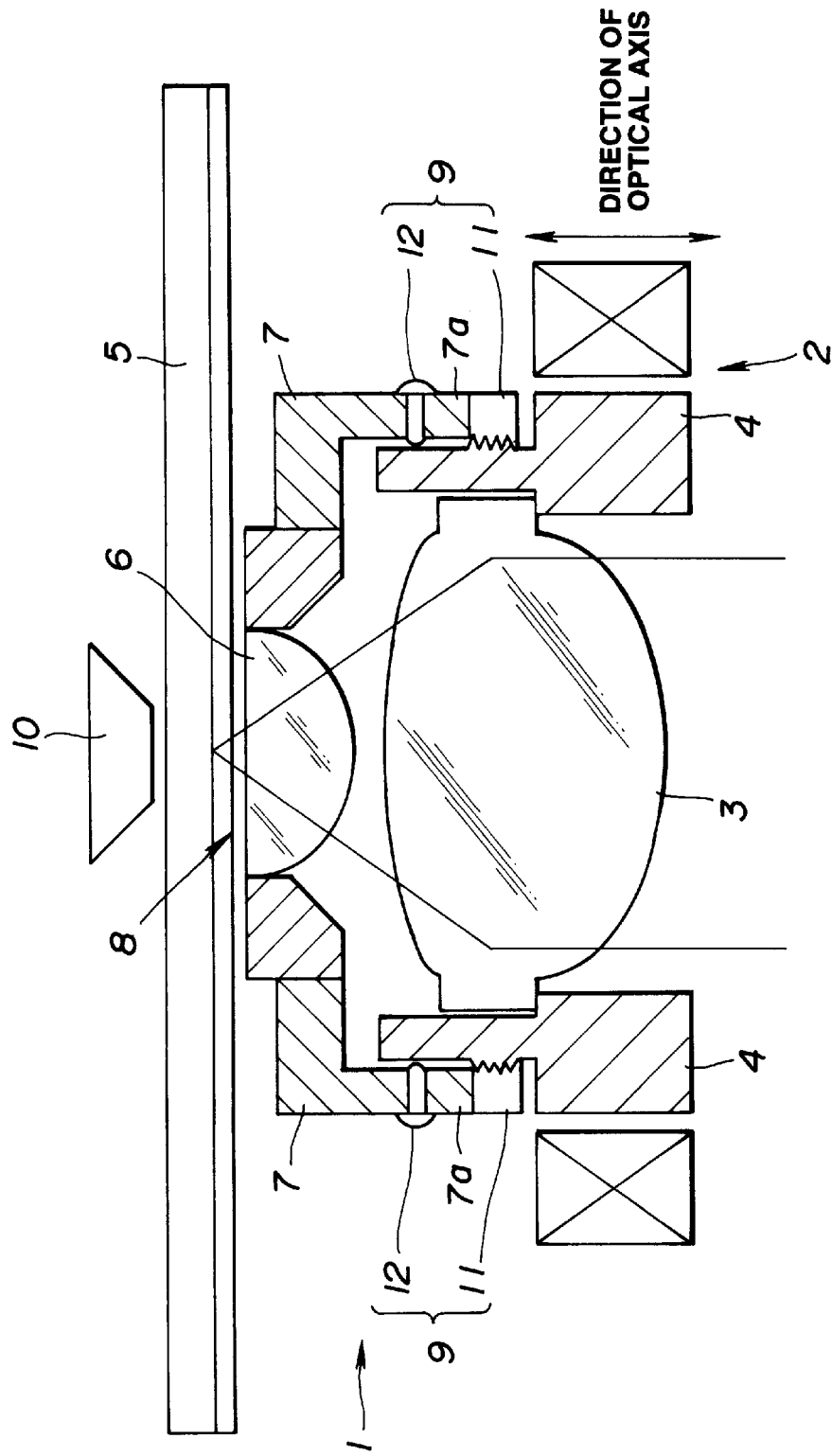
FIG. 1 shows an example of an objective lens unit loaded on an optical pickup device according to the present invention.

Referring to the drawings, preferred embodiments of the optical pickup device and the method for adjusting the optical pickup device according to the present invention will be explained in detail.

An optical pickup device of the present embodiment carries an objective lens unit 1 for converging the laser light beam at a pre-set position of a disc, as shown in FIG. 1. The objective lens unit 1 includes an objective lens 3 of a numerical aperture of approximately 0.45, as a second objective lens, and a pair of objective lens holders 4 for supporting the objective lens 3. The objective lens unit 1 also includes a forward lens 6, as a first lens, arranged coaxially with the optical axis of the objective lens 3 between the objective lens 3 and a disc 5 and a pair of forward lens holders 7 for supporting the objective lens 3. The objective lens unit 1 further includes an adjustment unit 9 for moving the forward lens holders 7 along the optical axis and for maintaining a constant value of an air gap 8 defined between the forward lens 6 and the disc 5. The objective lens unit is loaded on a biaxial electromagnetic actuator 2 for moving the objective lens 3 and the forward lens 6 along the optical axis and in the tacking direction.

For recording the information on a magneto-optical disc, a magnetic head 10 for impressing an external magnetic field as required across a pre-set area irradiated with the laser light beam on the magneto-optical disc may be loaded on the optical pickup device. This magnetic head 10 is mounted facing the forward lens 6 with the disc 5 in-between, or on the same side as the forward lens 6 with respect to the disc 5 in the vicinity of the forward lens 6.

The biaxial electromagnetic actuator 2 drives the objective lens 3 and the forward lens 6 along the optical axis and in the tracking direction. Specifically, the biaxial electromagnetic actuator 2, supplied with a signal derived from the focusing error signals and tracking error signals, can adjust the distance between the forward lens 6 and the disc 5 by way of focusing control, while it can trace the laser light beam irradiated on the disc in a vertical direction with respect to the track.

The objective lens 3 and the forward lens 6 are mounted on the sole optical axis for converging the laser light on the disc 5. The objective lens 3 and the forward lens 6, thus arranged, can constitute a double-set objective lens and can set the numerical aperture to not less than 0.8. Although a semi-spherical lens is used as the forward lens 6, a non-spherical lens may also be used.

The forward lens 3 is mounted for defining the air gap 8 with respect to the disc 5. The air gap 8, thus defined between the disc 5 and the forward lens 6, can be adjusted by the adjustment unit 9.

The adjustment unit 9 is made up of movement means 11 for moving the forward lens 6 and the forward lens holders 7 in a direction along the optical axis, and fixation means 12 for fixing the movement means 11 at a pre-set position.

Figure 2:
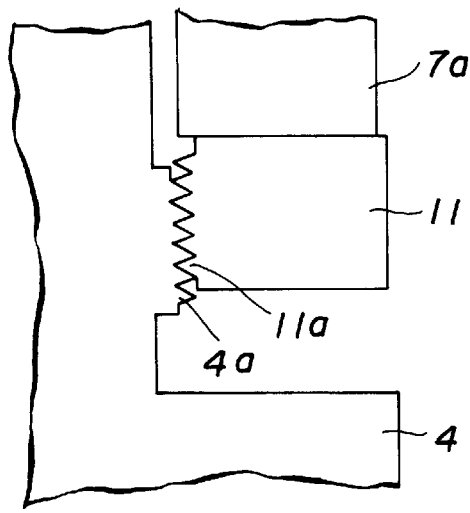
FIG. 2 is an enlarged schematic view showing the vicinity of exemplary movement means of an adjustment unit provided on the objective lens unit.

The movement means includes a threaded portion 4a formed on the outer periphery of the objective lens holder 4 meshing with a similar threaded portion 11a formed on the inner periphery of a ring as movement means 11, as shown in FIG. 2. For assuring smooth position adjustment of the forward lens 6, the objective lens holder 4 and the forward lens holders 7 are arranged for forming an air film in-between. The forward lens holders 7 has its terminal portion 7a arranged in contact with a ring as movement means 11 so that, as the movement means 11 is moved along the optical axis, the forward lens 6 is moved along the optical axis. The movement means 11 may be moved by, for example, electromagnetic driving means, not shown.

During assembling the optical pickup device, the movement means 11 is run in rotation by a signal outputted by a movement means driving circuit provided in the forward lens adjustment circuit, as later explained, for moving the forward lens 6 and the forward lens holders 7 in a direction along the optical axis for changing the distance between the objective lens 3 and the forward lens 6 and the distance between the forward lens 6 and the disc 5.

Thus, since the movement means 11 can move the forward lens 6 in the direction along the optical axis, it becomes possible to make optimum adjustment of the air gap 8 defined between the disc 5 and the forward lens 6.

The fixation means 12 may, for example, be constituted by a set screw. During assembling of the optical pickup device, the fixation means 12 is responsive to an output signal of a fixation means driving circuit provided in the forward lens adjustment circuit as later explained for maintaining the distance between the forward lens 6 and the objective lens 3 at a constant value.

The fixation means 12 may also be an adhesive for immobilizing the forward lens 6 in position, instead of being the set screw.

Thus, since the fixation means 12 can immobilize the forward lens 6 in position, a constant distance can be kept between the objective lens 3 and the forward lens 6.

With the above-described structure of the optical pickup device, there is produced spherical aberration in the laser 1 illuminated on the surface of the disc 5 due to the air gap 8 produced between the forward lens 6 and the disc 5. It is noted that, if a semi-spherical lens is used as the forward lens 6, the spherical aberration $W_{40}$ due to the air gap 8 defined between the semi-spherical lens and the disc 5 is given by the following equation (1):

$$W_{40} = -(h/8)n^2(n^2-1)\sin^4\theta_0 \qquad (1)$$

where h, n and $\sin\theta_0$ denote the air gap, refractive index of the disc 5 and the numerical aperture of the double-set objective lens, respectively.

Should the spherical aberration represented by this equation (1) be increased, playback characteristics at the time of reproducing the information signals from the disc 5 by the present optical pickup device are deteriorated significantly.

For example, if the double-set objective lens is constituted with the wavelength $\lambda$ of the laser light outgoing from a light source of 680 nm and the air gap h of 75 $\mu$m, the wavefront aberration of approximately $3\lambda$ at the maximum is generated, as may be seen from the equation (1). Therefore, with the optical pickup device of the instant embodiment, the objective lens unit 1 is constructed so that, by optimizing the non-sphericity of the objective lens 3, the spherical aberration due to this non-sphericity is eliminated and no aberration persists at the air gap h of 75 $\mu$m.

If the thickness of the disc 5 has an error of $\Delta t$ from a pre-set value t, and the biaxal electromagnetic actuator moves the objective lens 3 and the forward lens 6 in the direction along the optical axis for minimizing the error in the focusing direction, the air gap h is varied by $\Delta t/n$. At this time, the amount of the spherical aberration $\Delta W_{40D}$ produced by the disc 5 and the amount of the spherical aberration $\Delta W_{40A}$ produced by the air gap 8 are given, respectively, by the following equations (2) and (3):

$$\Delta W_{40D} = (\Delta t^2/8a)n(n-1)\sin^4\theta_0 \qquad (2)$$

$$\Delta W_{40A} = -(\Delta t/8)n(n^2-1)\sin^4\theta_0 \qquad (3)$$

where a denotes the radius of SIL.

If the radius a of the semi-spherical lens is 1.25 mm, the refractive index n of the objective lens is 1.5 and NA of the objective lens unit 1 is 0.8, the thickness error Δt of the disc 5 needs to be set to approximately 10 μm or less in order that the sum of the wavefront aberration represented by the equations (2) and (3), that is $\Delta W_{40D}+\Delta W_{40A}$, with sin $\Gamma_0=0.533$, will be $\lambda/4$ or less.

On the other hand, if the disc reproducing device is constituted using an objective lens of a high numerical aperture, the allowance for coma aberration produced by disc tilt is significantly lowered with increased substrate thickness. Thus, for constituting a double-group objective lens with the numerical aperture of the objective lens of 0.6 or more by way of disc reproduction, the disc substrate needs to be reduced in thickness.

Figure 3:
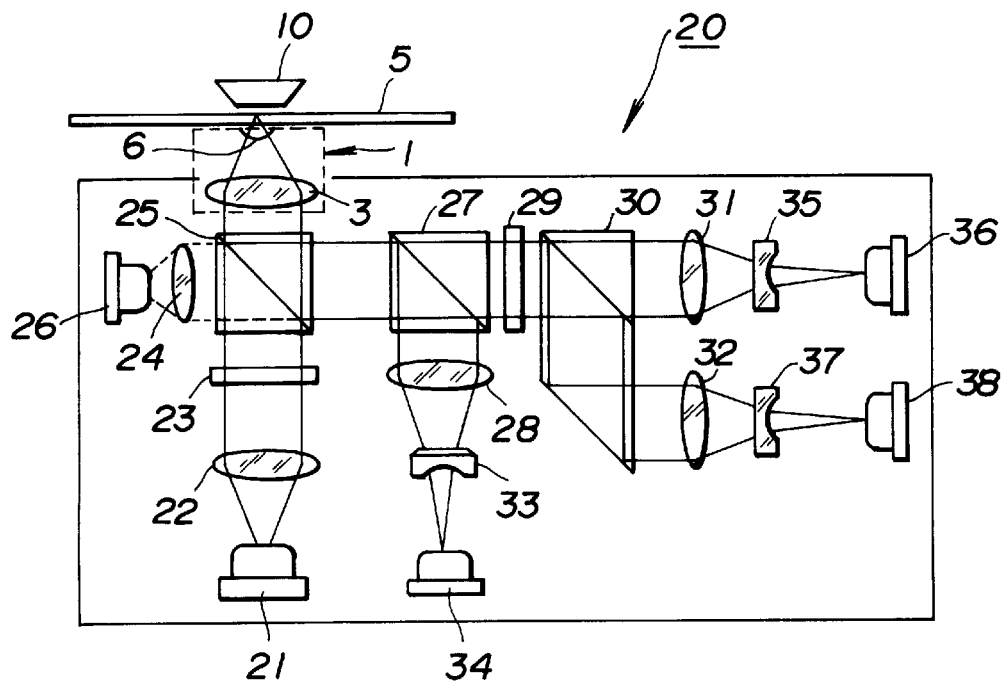
FIG. 3 shows the structure of an exemplary optical system of the optical pickup device.

The above-described objective lens unit 1 is loaded on an optical system 20 of an optical pickup device applied to, for example, a magneto-optical disc shown in FIG. 3. Since the objective lens unit 1 is loaded on and unified to the bi-axial electromagnetic actuator, the conventional technique can be directly applied as a system for focusing control and tracking control. The optical system 20 of the present optical pickup device includes a semiconductor laser 21 for radiating a laser light beam with a wavelength of 680 nm, and a collimator lens 22 for collimating the laser light beam radiated from the semiconductor laser 21. The optical system 20 also includes a diffraction lattice 23 for diffracting the laser light transmitted through the collimator lens 22 and a beam splitter 25 for splitting the laser light transmitted through the diffraction lattice 23 towards the objective lens 3 and a lens 24. The optical system 20 further includes an objective lens 3 and forward lens 6 receiving the laser light transmitted through the beam splitter 25 as incident light for converging the incident laser light beam on the magneto-optical disc 5.

Also, in the optical system 20 of the optical pickup device, the laser light outgoing from the semiconductor laser 21 falls on the beam splitter 25 via collimator lens 22 and diffraction lattice 23 so that part of the incident laser light is collected by the lens 24 to fall on a photodetector 26. This photodetector 26 furnishes the incident laser light as an output signal to an automatic power control (APC) circuit, not shown. Based on an output signal of the photodetector 26, the APC circuit manages control so that the laser light radiated by the semiconductor laser 21 to fall on the magneto-optical disc 5 will be constant in light volume.

The reflected laser light from the magneto-optical disc 5 falls on the beam splitter 25 via forward lens 6 and objective lens 3 and part of the p-polarized light (e.g., 30%) and the s-polarized light are reflected to fall on a beam splitter 27. Part of the laser light transmitted through the beam splitter 27 falls on a lens 28, while the remaining laser light portion is led via a half-wave plate 29 to a polarized beam splitter 30. This polarized beam splitter 30 splits the incident light by light polarization into a p-polarized component and an s-polarized component which then fall on lenses 31, 32.

The laser light reflected by the beam splitter 27 to fall on the lens 28 falls on a photodetector 34 via a lens 33 which gives astigmatic aberration to the laser light. The laser light thus incident on the photodetector 34 is converted into electrical signals corresponding to the light intensity so as to be supplied as servo error signals to a servo head amplifier as later explained. The laser light transmitted through the polarized beam splitter 30 falls on a photodetector 36 via lenses 31 and 35 to then fall on a photodetector 38 via lenses 32 and 37. The laser light incident on the photodetectors 36, 38 the laser light incident on the photodetectors 36, 38 is converted into electrical signals corresponding to light intensity and outputted. The output signals are differentially amplified and outputted as reproduced high-frequency (RF) signals to an RF head amplifier as later explained.

Figure 4:
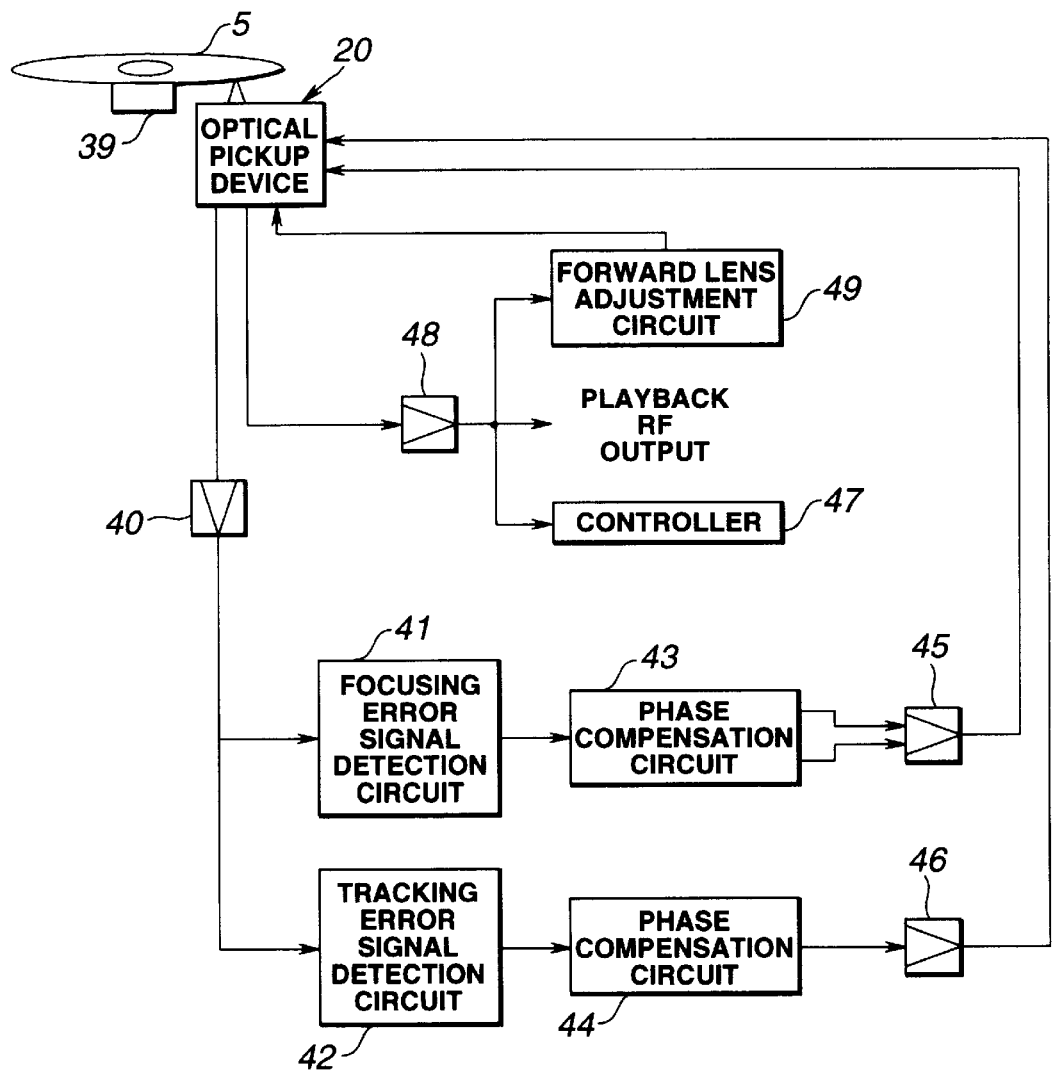
FIG. 4 is a block diagram showing an exemplary electrical structure of the optical pickup device.

The electrical configuration of the above-described optical pickup device 20 is shown in FIG. 4, in which the magneto-optical disc 5 is run in rotation at a constant angular velocity by a spindle motor 39 at the time of recording and/or reproduction of information signals. The laser light is irradiated in a pre-set area of the magneto-optical disc 5 for recording information signals as recording pits. Also, in the configuration of FIG. 4, the laser light is illuminated on a pre-set area of the magneto-optical disc 5 run in rotation at a constant velocity and the light volume of the reflected laser light is detected for reproducing the recorded information signals.

At this time, the servo error signals outputted by the photodetector 34 provided in the optical pickup device 20 are amplified by a servo head amplifier 40 and thence supplied to a focusing error signal detection circuit 41 and a tracking error signal detection circuit 42 for detecting focusing and tracking error signals, respectively.

The focusing error signals outputted by the focusing error signal detection circuit 41 and the tracking error signals outputted by the tracking error signal detection circuit 42 are phase-compensated by phase compensation circuits 43, 44, respectively, so as to be then amplified by amplifiers 45, 46 with pre-set gains, respectively. The amplified tracking and focusing error signals are entered to the optical pickup device 20 for driving the biaxial electromagnetic actuator for driving the objective lens unit 1 in the tracking and focusing directions, respectively.

In the usual operating state in which the focusing servo becomes locked, the amplifier 45 selects an output of the phase compensation circuit 43 as an input. However, if a focusing servo engagement control signal is entered from a controller 47, a search signal from the controller 47 is selected for carrying out the engagement operation.

On the other hand, the RF signals outputted by the optical pickup device 20 are entered to an RF head amplifier 48 for amplification at a pre-set gain. The resulting amplified signals are decoded by a decoding circuit, not shown, for reproducing the information signals recorded on the magneto-optical disc 5 as reproduced RF signals.

Moreover, the reproduced RF signals are entered to a forward lens adjustment circuit 49 so as to be used for adjusting the objective lens unit 1 during assembling the optical pickup device. With the forward lens adjustment circuit 49, the forward lens 6 is moved in a direction along the optical axis for optimizing the input playback RF signals and is immobilized when the playback RF signals have become optimum.

With the forward lens adjustment circuit 49, the playback signals are entered to control the adjustment unit 9 which moves the objective lens unit 1 in a direction along the optical axis for immobilizing the objective lens unit 1 at a pre-set position for adjusting the distance between the objective lens 3 and the forward lens 6 for maintaining a constant value of the air gap 8 defined between the forward lens 6 and the magneto-optical disc 5.

Figure 5:
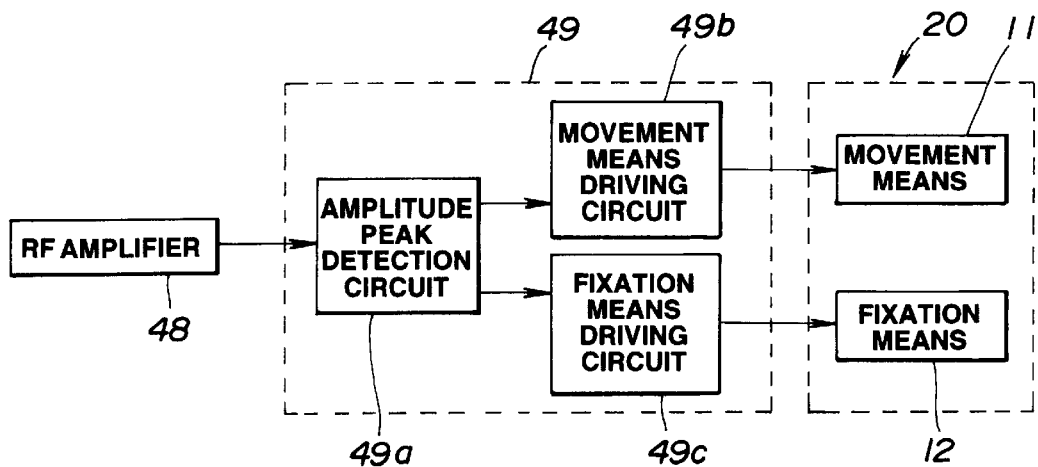
FIG. 5 is a block diagram showing an exemplary forward-lens adjustment circuit provided in the optical pickup device.

Referring to FIG. 5, this forward lens adjustment circuit 49 includes an amplitude peak detection circuit 49a supplied with an input signal from the RF head amplifier 48 to detect amplitude peaks of the reflected laser light from the magneto-optical disc 5, a movement means driving circuit 49b supplied with a signal from the amplitude peak detection circuit 49a for driving the movement means 11 for adjusting the position of the forward lens 6 and a fixation means driving circuit 49c supplied with an input signal from the amplitude peak detection circuit 49a for driving the fixation means 12 for immobilizing the forward lens 6 at a pre-set position.

The amplitude peak detection circuit 49a is supplied via RF head amplifier 48 with playback RF signals which are light volume signals of the laser light irradiated on the magneto-optical disc 5. The amplitude peak detection circuit 49a detects changes in amplitude of the input playback RF signals for detecting changes in the reflected light volume from the magneto-optical disc 5.

This amplitude peak detection circuit 49a outputs control signals to a movement means driving circuit 49b for moving the movement means 11 along the optical axis for optimizing the amplitude of the playback RF signals by the input playback RF signals. Also, the amplitude peak detection circuit 49a outputs control signals to the fixation means driving circuit 49c so that the movement means 11 is immobilized when the playback RF signals have become optimum.

The movement means driving circuit 49b is a circuit supplied with control signals from the amplitude peak detection circuit 49a for controlling the movement means 11 for minimizing the wavefront aberration of the laser light illuminated on the magneto-optical disc 5 due to the air gap 8 and the surface of the magneto-optical disc 5.

If the thickness of the magneto-optical disc 5 deviates from the pre-set thickness, spherical aberration is produced, as discussed above. Thus, by entering a signal of the movement means driving circuit 49b to the movement means 11, the light volume signal from the optical pickup device 20 is changed for adjusting the position of the forward lens 6 for optimizing the playback RF signals. Thus, by entering the signal from the movement means driving circuit 49b to the movement means 11, the light volume signal from the optical pickup device 20 is changed for adjusting the position of the forward lens 6 for optimizing the playback RF signals.

When the playback RF signals have become optimum, the fixation means driving circuit 49c is fed with a control signal from the amplitude peak detection circuit 49a for outputting a signal of immobilizing the forward lens 6 at the pre-set position by the fixation means 12.

The forward lens adjustment circuit 49, thus constructed, detects the playback RF signals for adjusting the position of the forward lens 6 in the direction along the optical axis, so that the laser light can be converged in a pre-set area of the magneto-optical disc 5 without producing the wavefront aberration. This enables the objective lens unit 1 of high numerical aperture to record/reproduce information signals for the magneto-optical disc 5, thus improving the recording density of the magneto-optical disc 5.

The position adjustment of the forward lens 6 by the forward lens adjustment circuit 49 is now explained. This position adjustment of the forward lens 6 is carried out during assembling of the optical pickup device 20. The method for position-adjustment of the forward lens 6 has a step of moving the forward lens 6 facing the disc 5 in the direction along the optical axis, and a step of immobilizing the forward lens 6 at a pre-set position.

The step of moving the forward lens 6 in the direction along the optical axis is a step in which the playback RF signals from the RF head amplifier 48 are detected by the amplitude peak detection circuit 49a for controlling the movement means driving circuit 49b.

The playback RF signals entered to the amplitude peak detection circuit 49a contain the effects of the spherical aberration as the wavefront aberration produced by the thickness of the disc substrate. Therefore, the amplitude peak detection circuit 49a performs position adjustment of the forward lens 6 for diminishing the effect of the playback RF signals by the spherical aberration.

Figure 6:
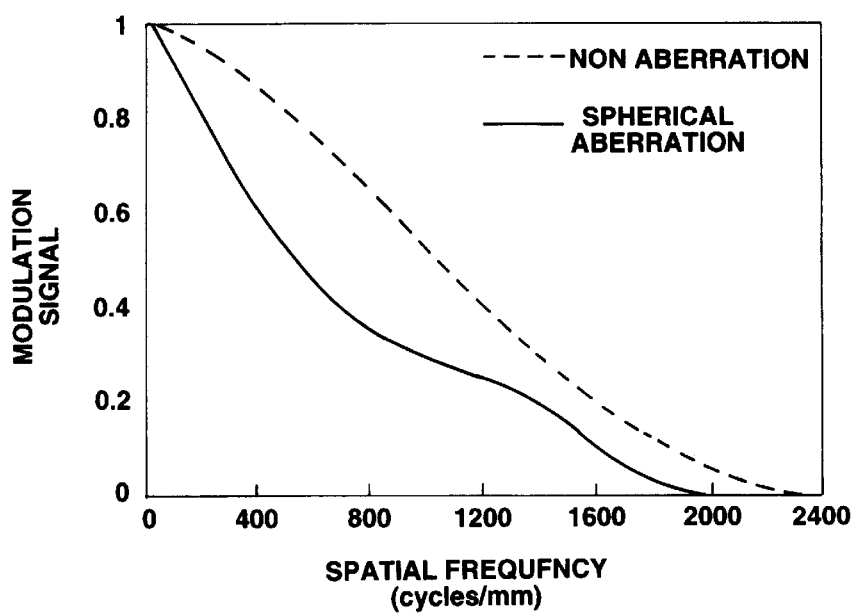
FIG. 6 is a graph showing spatial frequency dependency of the optical pickup device incase of presence and absence of spherical aberration of modulated signals detected by the optical pickup device.

FIG. 6 shows calculated values of RF signals of an optical pickup device in the presence of a pre-set amount of the spherical aberration as this wavefront aberration. Referring to FIG. 6, showing modulated signals of the playback RF signals and the spatial frequency of the optical pickup device on the ordinate and on the abscissa, respectively, the difference between the modulation signal in the presence of the spherical aberration and that in the absence of spherical aberration becomes significant in the spatial frequency range of from approximately 400 to approximately 800 (cycles/mm). Thus, the effect of the spherical aberration becomes most acute in the spatial frequency range of from approximately 400 to approximately 800 (cycles/mm).

Thus, with the method for adjusting the position of the forward lens 6 in the instant embodiment, the step of driving the forward lens 6 facing the magneto-optical disc 5 can achieve adjustment with utmost sensitivity to spherical aberration because the forward lens 6 is adjusted in the spatial frequency range of from approximately 400 to approximately 800 (cycles/mm) which is most susceptible to spherical aberration.

Then, after the position adjustment of the forward lens 6 has come to a close in the step of immobilizing the forward lens 6 at a pre-set position, the forward lens 6 is immobilized at a position which gives a maximum value of the play back RF signals. The fixation means driving circuit 49c is fed with a control signal from the amplitude peak detection circuit 49a. This control signal immobilizes the fixation means 12 provided in the optical pickup device.

Since the method for adjusting the position of the forward lens 6 has the step of moving the forward lens facing the magneto-optical disc 5 in the direction along the optical axis and the step of immobilizing the forward lens 6 at a pre-set position, it becomes possible to set the distance between the forward lens 6 and the objective lens 3 and the air gap 8 defined by the forward lens 6 and the magneto-optical disc 5 to high precision and to hold the distance and the air gap at pre-set values.

If, with the optical pickup device of the instant embodiment, modulated signals equivalent to those of the digital video disc (DVD) are recorded/reproduced on or from the magneto-optical disc 5, it is the mark length in the vicinity of 4T to 6T, where T means one channel clock, that corresponds to the above frequency range. By position-adjusting the forward lens 6 for maximizing the amplitude of these playback signal components, the spherical aberration produced by thickness deviation of the disc substrate can be suppressed to a minimum for assuring optimum reproduction of the information signals.

Meanwhile, the playback RF signals in their entirety are subjected to wavefront aberration due to thickness deviation of the disc substrate thus affecting the modulated signals. Thus, the forward lens 6 may also be adjusted for optimizing the envelope as a waveform by the maximum and minimum amplitude values of the playback RF signals.

Moreover, with the present optical pickup device, the forward lens 6 may also be adjusted for eliminating the effect of the wavefront aberration for minimizing jitter of the playback RF signals.

The above-mentioned spherical aberration is produced not only during playback of the information signals recorded on the magneto-optical disc but also during recording of the information signals due to thickness deviations of the disc substrate. Thus, with a device capable of recording and reproducing information signals, such as the optical pickup device for the magneto-optical disc of the instant embodiment, the forward lens 6 is desirably adjusted by reproducing the magneto-optical disc 5 having recorded thereon signals of the frequency range for which the effect of the spherical aberration becomes significant, such as ROM disc. It is also possible to pre-format signals for adjusting the forward lens 6 in a portion of the magneto-optical disc 5.

It should be noted that the present optical pickup device and the adjustment method for adjusting the forward lens can not only be applied to an optical pickup device for reproducing the magneto-optical disc but also to optical discs other than the magneto-optical disc, such as phase change type disc.

It should also be noted that the present adjustment method for adjusting the optical pickup device is not limited to the method for adjusting the so-called automatic adjustment type forward lens. That is, the playback RF signals may be detected by, for example, an oscilloscope, and the forward lens may be adjusted manually for adjusting the optical pickup device. Moreover, the optical pickup device may be adjusted not only during assembling the pickup but also in the course of usual recording/reproduction.

What is claimed is:

1. An optical pickup device comprising:

a double-set objective lens having a first lens and a second lens;

first movement means for simultaneously moving said first and second lenses at least along the optical axis;

second movement means for moving said first lens to a desired position, arranged facing an optical recording medium along the optical axis relative to said second lens;

signal generating means for generating a signal that drives said second movement means; and mechanical fixation means for, after determination of said desired position, immobilizing said first lens, moved by said second movement means, at said desired position.

2. The optical pickup device as claimed in claim 1 wherein the objective lens has a NA of not less than 0.8.

3. The optical pickup device as claimed in claim 1 wherein the surface of said first lens facing the optical recording medium is substantially planar.

4. The optical pickup device as claimed in claim 1, wherein said signal generating means comprises:

a detector, for detecting the information of the optical recording medium via said objective lens; and a controller, for driving said second movement means based on the signal from said detector.

5. An optical recording/reproducing apparatus comprising:

a double-set objective lens having a first lens and a second lens, said first lens arranged facing an optical recording medium along an optical axis relative to said second lens;

first movement means for unidirectionally and simultaneously moving said first and second lenses at least along the optical axis;

second movement means, separate from said first movement means, for moving said first lens to a desired position;

detection means for detecting the information of the optical recording medium via said objective lens;

signal generation means for generating a driving signal based on said information from said detection means;

control means for driving said second movement means based on said signal from said signal generation means; and mechanical fixation means for, after determination of said desired position, immobilizing said first lens that is moved by said second movement means to said desired position.

6. The optical recording/reproducing apparatus as claimed in claim 5 wherein the objective lens has a NA of not less than 0.8.

7. The optical recording/reproducing apparatus as claimed in claim 5 wherein the surface of said first lens facing the optical recording medium is substantially planar.

8. A method for adjusting a double-set objective lens having a first lens and a second lens used for recording and/or reproducing an optical recording medium comprising the steps of:

detecting and reproducing as a signal information from the optical recording medium;

driving movement means that moves said first lens, based on said reproduced signal, to a desired position after determining said desired position based on said information, said first lens facing said optical recording medium relative to said second lens; and immobilizing said first lens at said desired position using a mechanical fixation means.

9. The method for adjusting a double-set objective lens as claimed in claim 8, wherein said reproduced signal comprise focusing error signals and tracking error signals.

* * * * *